(12) United States Patent
Sedlacek et al.

(10) Patent No.: US 8,958,522 B2
(45) Date of Patent: Feb. 17, 2015

(54) FUEL HANDLING AREA PASSIVE FILTRATION DESIGN

(75) Inventors: Gary L. Sedlacek, Jefferson Hills, PA (US); Luke G. Mulhollem, Stahlstown, PA (US); Michael A. Chvala, Zelienople, PA (US); Justin D. Stirling, Mars, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 958 days.

(21) Appl. No.: 13/151,714

(22) Filed: Jun. 2, 2011

(65) Prior Publication Data

US 2012/0307957 A1    Dec. 6, 2012

(51) Int. Cl.
*G21C 19/32* (2006.01)
*B01D 45/10* (2006.01)
*G21F 9/04* (2006.01)
*G21F 9/02* (2006.01)

(52) U.S. Cl.
CPC . *B01D 45/10* (2013.01); *G21F 9/04* (2013.01); *G21F 9/02* (2013.01); *G21C 19/32* (2013.01); *B01D 2279/35* (2013.01)
USPC ............................ 376/313; 376/272; 376/314

(58) Field of Classification Search
None
See application file for complete search history.

(56) References Cited

U.S. PATENT DOCUMENTS

| | | | | |
|---|---|---|---|---|
| 3,713,968 A * | 1/1973 | Kennedy et al. | ............... | 376/293 |
| 3,720,043 A * | 3/1973 | Kovach | ............................ | 95/116 |
| 4,859,405 A * | 8/1989 | Squarer et al. | ................ | 376/299 |
| 5,017,331 A * | 5/1991 | Eckardt | .......................... | 376/313 |
| 5,904,756 A * | 5/1999 | Fujii et al. | ....................... | 96/188 |
| 2006/0188055 A1* | 8/2006 | Eckardt | .......................... | 376/283 |

OTHER PUBLICATIONS

International Preliminary Report on Patentability for PCT/US2012/039251 dated Dec. 12, 2013 (Form PCT/IB/326, PCT/IB/373, PCT/ISA/237).

* cited by examiner

*Primary Examiner* — Jack W Keith
*Assistant Examiner* — Daniel Wasil
(74) *Attorney, Agent, or Firm* — Richard J. Coldren; Westinghouse Electric Company LLC

(57) ABSTRACT

The present invention relates to a passive filtration system for a fuel handling area having a spent fuel pool in a nuclear reactor. The passive filtration system reduces a discharge into the atmosphere of particulates, such as radioactive particulates, generated in a spent fuel pool boiling event. The passive filtration system includes a discharge path, a vent mechanism positioned between the fuel handling area and the discharge path. The vent mechanism is structured to release a steam and air mixture from the fuel handling area to the discharge path. The steam and air mixture includes the particulates. The passive filtration system further includes an air filtration unit located in the discharge path and this unit has at least one passive filter. The steam and air mixture is forced through the at least one passive filter due to a differential pressure generated in the fuel handling area. The at least one passive filter traps particulates from the steam and air mixture to produce a filtered steam and air mixture that is released through a second vent mechanism into the atmosphere.

9 Claims, 2 Drawing Sheets

FUEL HANDLING AREA PASSIVE FILTRATION DESIGN

FIELD OF THE INVENTION

The present invention relates generally to a passive filtration system for a nuclear reactor power plant and more specifically, to a passive filtration system in the fuel handling area of the nuclear reactor power plant.

BACKGROUND

The generation of electric power by a nuclear reactor is accomplished by the nuclear fission of radioactive materials. Due to the volatility of the nuclear reaction, nuclear power plants are required by practice to be designed in such a manner that the health and safety of the public is assured.

In conventional nuclear reactors used for generating electric power, the nuclear fuel becomes spent and is removed at periodic intervals from the nuclear reactor and replaced with fresh fuel. The spent fuel generates decay heat and remains radioactive after it has been removed from the nuclear reactor. Thus, a safe storage facility is provided to receive the spent fuel. In nuclear reactors, such as pressurized water reactors, a pool is provided as a storage pool for the spent fuel. The spent fuel pool is designed to contain a level of water such that the spent fuel is stored underwater. The spent fuel pool is typically constructed of concrete and is at least 40 feet deep. In addition to the level of the water being controlled and monitored, the quality of the water is also controlled and monitored to prevent fuel degradation when it is in the spent fuel pool. Further, the water in the spent fuel pool is continuously cooled to remove the heat which is produced by the spent fuel.

In general, a nuclear power plant includes a spent fuel pool cooling system which is designed to remove decay heat generated by stored spent fuel from the water in the spent fuel pool. Removal of the decay heat maintains the spent fuel pool water temperature within acceptable regulatory limits. The spent fuel pool cooling system typically includes a spent fuel pool pump which circulates the high temperature water from within the spent fuel pool through a heat exchanger and then returns the cooled water to the spent fuel pool. In one embodiment, the spent fuel pool cooling system includes two mechanical trains of equipment. Each train includes one spent fuel pool pump, one spent fuel pool heat exchanger, one spent fuel pool demineralizer and one spent fuel pool filter. The two trains of equipment share common suction and discharge headers. In addition, the spent fuel pool cooling system includes the piping, valves and instrumentation necessary for system operation. In this embodiment, one train is continuously cooling and purifying the spent fuel pool while the other train is available for water transfers, in-containment refueling water storage tank purification, or alignment as a backup to the operating train of equipment.

FIG. 1 shows a spent fuel pool cooling (SFPC) system 10 during its normal operation in accordance with the prior art. The SFPC 10 includes a spent fuel pool 15. The spent fuel pool 15 contains a level of water 16 which is at a high temperature as a result of the intense temperature of the spent fuel (not shown) that is transferred from the nuclear reactor (not shown) into the spent fuel pool 15. The SFPC system 10 includes trains A and B. Trains A and B are employed to cool the water in the spent fuel pool 15. As previously described, it is typical to operate either one of train A or train B to continuously cool and purify the spent fuel pool 15 while the other train is available as a back-up. Each of trains A and B include a SFPC pump 25, a heat exchanger 30, and a SFPC demineralizer and filter system 45. These trains share a common suction header 20 and a common discharge header 50. In each of trains A and B, water exits the spent fuel pool 15 through the suction header 20 and is pumped through the SFPC pump 25 to the SFPC heat exchanger 30. In the SFPC heat exchanger 30, a flow line 40 passes water from the component cooling water system (CCWS) (not shown) through the SFPC heat exchanger 30 and back to the CCWS. The heat from the water entering the SFPC heat exchanger 30 (from the spent fuel pool 15) is transferred to the water provided by the flow line 40 and is returned back to the CCWS through the flow line 40. Cooled water exits the SFPC heat exchanger 30 and passes through the SFPC demineralizer and filter system 45 positioned downstream of the SFPC heat exchanger 30. Purified, cooled water exits the demineralizer and filter system 45, is transported through the common discharge header 50, and is returned to the spent fuel pool 15.

Recently, nuclear reactor manufacturers have offered passive plant designs, i.e., plants that will mitigate accident events in a nuclear reactor without operator intervention or off-site power. The Westinghouse Electric Company LLC offers the AP1000 passive plant design. The AP1000 design includes advanced passive safety features and extensive plant simplifications to enhance the safety, construction, operation, and maintenance of the plant. The AP1000 design emphasizes safety features that rely on natural forces. The safety systems in the AP1000 design use natural driving forces such as pressurized gas, gravity flow, natural circulation flow, and convection. The safety systems do not use active components (such as, pumps, fans or diesel generators) and are designed to function without safety grade support systems (such as, AC power, component cooling water, service water, and HVAC). The AP1000 fuel handling area is designed such that the primary means for fuel protection is provided by passive means and relies on the boiling of the spent fuel pool water inventory to remove decay heat. Thus, in extreme cases, the spent fuel pool can boil.

Assuming a complete failure of the active spent fuel pool cooling system, spent fuel cooling can be provided by the heat capacity of the water in the spent fuel pool. Water make-up is provided to the spent fuel pool by a passive means to maintain the pool water level above the spent fuel while boiling of the pool water provides for the removal of decay heat. Boiling of the spent fuel pool water releases large quantities of steam into the fuel handling area. The steam mixes with the air in the fuel handling area and has to be released from this area to prevent a build-up of pressure. The steam/air mixture is released from the fuel handling area into the atmosphere. This can potentially result in the release of radioactive airborne contaminants into the atmosphere.

Analysis has shown that minimal radiation doses that are well within acceptable limits may result from the onset of boiling. However, it is advantageous to provide a spent fuel filtration system and method for further reducing the radioactive doses that are released into the atmosphere from the onset of boiling of the spent fuel pool in the fuel handling area of a nuclear reactor. It is desired that the system and method be a passive mechanism which is simple to design and implement, and is effective to remove radioactive particulates in the event of a spent fuel pool boiling event in the nuclear reactor.

SUMMARY OF THE INVENTION

In one aspect, the present invention provides a passive filtration system for a fuel handling area having a spent fuel pool in a nuclear reactor, to reduce a discharge into the atmosphere of particulates generated in a spent fuel pool boiling event. The passive filtration system includes a discharge path having a first end connected to the fuel handling area and a second end connected to the atmosphere; a vent mechanism positioned between the fuel handling area and the first end of the discharge path, the vent mechanism structured to release a steam and air mixture from the fuel handling area to the discharge path, the steam and air mixture includes the particulates; an air filtration unit located in the discharge path, the air filtration unit including at least one passive filter, the steam and air mixture forced through the at least one passive filter due to a differential pressure generated in the fuel handling area, the at least one passive filter structured to trap particulates from the steam and air mixture to produce a filtered steam and air mixture; and a second vent mechanism connected to the air filtration unit, the second vent mechanism structured to release the filtered steam and air mixture to the atmosphere.

In an embodiment, the passive filtration system can further include at least one drain connected to the air filtration unit, the drain structured to return to the fuel handling area or other suitable discharge point condensate generated from the steam and air mixture in the air filtration unit. In a further embodiment, the passive filtration system can include two drains. In still a further embodiment, the passive filtration system can include one drain located forward of the filter and the other drain located behind the filter.

In an embodiment, the first vent mechanism of the passive filtration system can include at least one temperature-actuated damper. In another embodiment, the second vent mechanism can include at least one fail open or gravity operated damper. In further embodiment, the first and second vent mechanisms can each include two dampers.

In an embodiment, the steam and air mixture released from the first vent mechanism has a higher level of particulates as compared to the filtered steam and air mixture released from the second vent mechanism.

In alternate embodiments, the nuclear reactor is a pressurized or boiling water reactor.

In another embodiment, the passive filter includes a high efficiency particulate air filter.

In still another embodiment, the particulates include radioactive particulates.

In another aspect, the present invention provides, a method of filtering particulates from a steam and air mixture generated by a spent fuel pool boiling event in the fuel handling area of a nuclear reactor prior to discharge of the steam and air mixture to atmosphere. The method includes discharging the steam and air mixture from the fuel handling area through a venting mechanism; passing the steam and air mixture through a passive filter; trapping at least a portion of the particulates contained in steam and air mixture into the passive filter to produce a filtered steam and air mixture; and discharging the filtered steam and air mixture through a venting mechanism into the atmosphere. The discharging and the passing of the steam and air mixture employs a passive means comprising a differential pressure generated in the fuel handling area.

DETAILED DESCRIPTION OF THE INVENTION

The present invention relates to a passive filtration system and the use of at least one passive filter in the fuel handling area in a nuclear reactor, such as a pressurized water reactor, to reduce a release of particulates, such as radioactive particulates, into the atmosphere as a result of a spent fuel pool boiling event.

Figure 1:
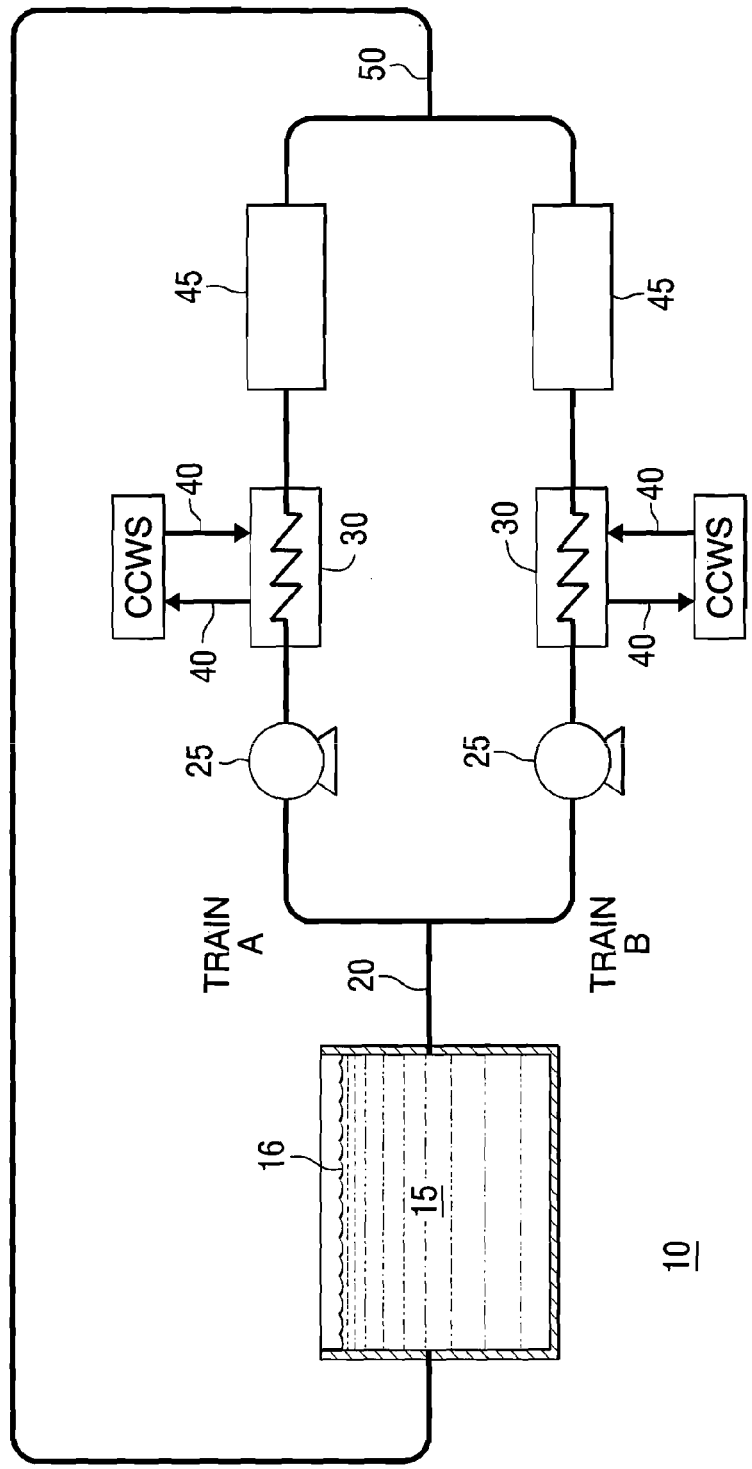
FIG. 1 shows, schematically, a spent fuel pool cooling system in accordance with the prior art.

In the nuclear reactor, a spent fuel pool is located in the fuel handling area. The spent fuel pool contains water and stores spent fuel removed from the nuclear reactor core. The spent fuel generates decay heat and remains radioactive after being removed from the nuclear reactor core and transferred into the spent fuel pool. Thus, a spent fuel pool cooling system is provided in nuclear reactors to remove decay heat and maintain the temperature of the water in the spent fuel pool at acceptable limits. Active and/or passive spent fuel pool cooling systems may be used. As previously described herein, FIG. 1 shows an example of an active spent fuel pool cooling system known in the art. Passive spent fuel pool cooling systems may be designed such that the water in the spent fuel pool boils to remove decay heat generated by the spent fuel. As a result of the boiling of the water in the spent fuel pool, large quantities of steam are generated in the fuel handling area. The steam mixes with the air in the fuel handling area. The steam and air mixture may contain particulates and contaminants, such as radioactive particulates and radioactive airborne contaminants. Further, the temperature and pressure in the fuel handling area increase as a result of boiling the water in the spent fuel pool. The mixture of steam and air is discharged from the fuel handling area, through a discharge path, and into the atmosphere to prevent the build-up of pressure in the fuel handling area. The release of the steam and air mixture can result in the release of airborne radioactive contaminants into the atmosphere.

The passive filtration system of the present invention provides a means of filtering the steam and air mixture. A vent mechanism is positioned in the fuel handling area. The vent mechanism is structured to release the steam and air mixture into a discharge path which is connected to the fuel handling area. The vent mechanism can include at least one temperature-actuated damper. As the temperature increases, the at least one temperature-actuated damper opens to vent steam and air from the fuel handling area into the discharge path. In one embodiment, there are two temperature-actuated dampers such that one is available as a back-up.

At least one passive filter can be positioned in the discharge path which extends from fuel handling area to the atmosphere. Thus, the steam and air which is vented through the temperature actuated damper(s) passes through the passive filter(s) prior to being discharged into the atmosphere. The steam and air mixture is forced through the passive filter(s) due to the pressure differential in the fuel handling area. The passive filter(s) is able to remove particulates and contaminants from the steam and air mixture generated in the fuel handling area as a result of a spent fuel pool boiling event. The particulates and contaminants can include radioactive particulates and airborne radioactive contaminants. Further, the passive filter(s) is effective in reducing the level of radioactive particulates and radioactive airborne contaminants that are discharged into the atmosphere. The passive filter(s) is available before, during and after a spent fuel pool boiling event. Analysis has found that the level of release of radioactive particulates is within acceptable limits provided by the United States Nuclear Regulatory Commission. However, the passive filter(s) of the present invention provides additional assurance that the release of radioactive particulates and contaminants is well within acceptable limits.

The passive filter(s) for use in the present invention can include a wide variety of filters known in the art which are able to remove particulates and/or contaminants from steam, air or mixtures thereof, without an active means. In one embodiment, the filters are High Efficiency Particulate Air (HEPA) filters. Generally, HEPA filters are composed of a mat of randomly arranged fibers. The fibers can be composed of a variety of materials, such as but not limited to fiberglass. Typically, HEPA filters are operable to trap particles by having the particles adhere to the fibers or the particles being embedded into the fibers.

In the present invention, the passive filter(s) provides a passive means for filtration of air to the atmosphere. The steam and air mixture is forced through the passive filter(s) by the differential pressure in the fuel handling area. Thus, there is no need for the use of an active means, such as a fan, to drive the steam and air mixture through the passive filter(s).

The discharge path between the fuel handling area and the atmosphere can include various designs to incorporate the passive filter(s) and filtration path. In one embodiment, at least one passive filter is contained in a housing which is positioned in an air filtration unit that is located in the discharge path. The air filtration unit includes a vent mechanism which releases the filtered steam and air mixture into the atmosphere. The vent mechanism includes at least one fail-open or gravity operated discharge damper. The at least one fail-open or gravity operated discharge damper is positioned downstream of the passive filter(s). The number of discharge dampers can vary. It is typical to have more than one discharge damper for the purpose of redundancy. Thus, during normal operation, the fail-open or gravity operated discharge damper(s) is capable to isolate the passive filter(s) from the atmosphere. Further, the fail-open or gravity operated discharge damper(s) protects the passive filter(s) from damage when not in use (e.g., during normal plant operation of the nuclear reactor).

In the present invention, the steam and air mixture which is released from the first vent mechanism has a higher level of particulates as compared to the filtered steam and air mixture that is released from the discharge damper(s).

In an embodiment, the air filtration unit includes at least one water drain or a drain path capable to return condensed steam from the air filtration unit into the fuel handling area or other suitable discharge point to reduce the potential for an accidental release of condensate which may contain radioactivity. In one embodiment, the air filtration unit includes two drains. One drain is positioned forward of the passive filter(s) which is located in the air filtration unit and the other drain is position behind, e.g., after or to the rear of, the passive filter(s).

During an emergency event, e.g., the spent fuel cooling system is not available and the spent fuel pool water heats up and boils to remove decay heat, the discharge damper(s) is open such that the passive filter(s) can receive steam and/or air from the fuel handling area and remove particulates, such as radioactive particulates, from the steam and air prior to its discharge from the discharge path into the atmosphere. During normal operation of the nuclear reactor, the discharge and/or temperature-operated damper(s) isolate the passive filter(s) and discharge/filtration path from the fuel handling area.

Figure 2:
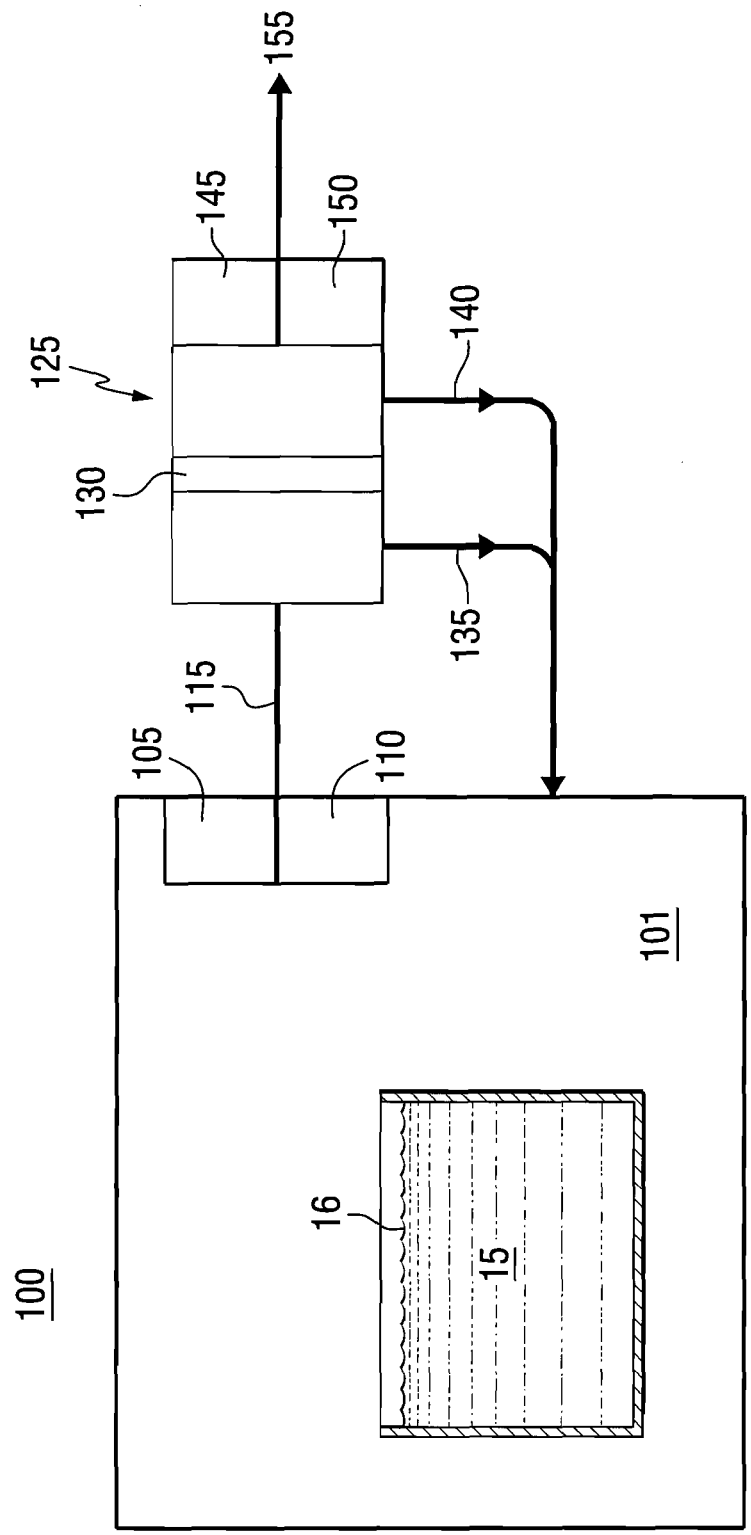
FIG. 2 shows, schematically, a passive spent fuel pool filtration system in accordance with an embodiment of the invention.

FIG. 2 shows a passive spent fuel pool filtration system 100 in accordance with an embodiment of the present invention. The spent fuel pool filtration system 100 includes the spent fuel pool 15 and water level 16 as shown in FIG. 2. Further, the spent fuel pool filtration system 100 includes a fuel handling area 101 and a discharge path 115. A first end of the discharge path 115 is connected to the fuel handling area 101 and a second end of the discharge path 115 is connected to the atmosphere 155. In FIG. 2, the spent fuel pool 15 is positioned in a fuel handling area 101. The fuel handling area 101 includes dampers 105,110 which are temperature-activated and capable to open to release steam/air from the fuel handling area 101 to a discharge path 115. The dampers 105,110 are positioned between, e.g., at the interface of, the fuel handling area 101 and the first end of the discharge path 115. In the discharge path 115 is positioned an air filtration unit 125. The air filtration unit 125 includes a HEPA filter 130. In an embodiment, the air filtration unit 125 can include more than one HEPA filter 130. The steam/air in the discharge path 115 enters the air filtration unit 125 and passes through the HEPA filter 130. The HEPA filter is capable to remove particulates and contaminants from the steam/air mixture. The filtered steam/air mixture then exits the HEPA filter 130, passes through dampers 145,150, connected to the air filtration unit 125, and is discharged into the atmosphere 155. The dampers 145,150 are fail-open, and motorized or pneumatic; or are gravity operated. Further, the air filtration unit 125 includes drains 135,140. Any condensate, e.g., water, that condenses from the steam/air can be collected in the drains 135,140 and returned to the fuel handling area 101. The drain 135 is located upstream of the HEPA filter 130 and the drain 140 is located downstream, e.g., after, the HEPA filter 130.

While the invention has been described in terms of various specific embodiments, those skilled in the art will recognize that the invention can be practiced with modifications within the spirit and scope of the appended claims.

The invention claimed is:

1. A passive spent fuel cooling system operable to remove decay heat from a fuel handling area of a nuclear reactor plant, comprising:
   a spent fuel pool,
      wherein the spent fuel pool contains water,
      wherein the spent fuel pool contains spent fuel removed from a core of a nuclear reactor of the nuclear reactor plant,
      wherein the spent fuel generates decay heat, and
      wherein the spent fuel pool is located in the fuel handling area and,
   wherein in a boiling event, the water boils to generate steam that mixes with air in the fuel handling area to form a mixture,
      the mixture containing particulates;
   a filtration system configured to at least partially remove the particulates, comprising:
      a discharge path having a first end connected to the fuel handling area and a second end connected to atmosphere;
      a first vent mechanism positioned in the fuel handling area at an interface of the fuel handling area and the first end of the discharge path,
         the first vent mechanism comprising at least one temperature-actuated damper that is operable to release the mixture from the fuel handling area into the discharge path;
      an air filtration unit located in the discharge path,
         the air filtration unit comprising at least one passive particulate air filter,
            the at least one passive particulate air filter comprising at least one fiber-containing mat,
               the at least one fiber-containing mat is structured to trap at least a portion of the particulates from the mixture in the at least one fiber-containing mat to produce a filtered mixture, responsive to the mixture being forced through the at least one passive particulate air filter due to a differential pressure generated in the fuel handling area; and a second vent mechanism located downstream of the at least one passive particulate air filter,
the second vent mechanism is structured to release the filtered mixture to the atmosphere.

2. The passive spent fuel cooling system of claim 1 further comprising
at least one drain connected to the air filtration unit,
the at least one drain is structured to return to the fuel handling area or other discharge point, condensate generated from the steam and air mixture in the air filtration unit.

3. The passive spent fuel cooling system of claim 2 wherein the at least one drain is two drains.

4. The passive spent fuel cooling system of claim 3
wherein one drain of the two drains is located upstream of the at least one passive filter, and
wherein the other drain of the two drains is located downstream of the at least one passive filter.

5. The passive spent fuel cooling system of claim 1 wherein the second vent mechanism comprises at least one fail open or gravity operated damper.

6. The passive spent fuel cooling system of claim 1 wherein the first and second vent mechanisms each comprise two dampers.

7. The passive spent fuel cooling system of claim 1 wherein the mixture released from the first vent mechanism has a higher level of particulates as compared to the filtered mixture released from the second vent mechanism.

8. The passive spent fuel cooling system of claim 1 wherein the nuclear reactor is either
a pressurized water nuclear reactor, or
a boiling water nuclear reactor.

9. The passive spent fuel cooling system of claim 1 wherein the particulates comprises radioactive particulates.

* * * * *